United States Patent
Hernandez

(10) Patent No.: US 7,299,687 B2
(45) Date of Patent: Nov. 27, 2007

(54) ROUGH ROAD DETECTION SYSTEM

(75) Inventor: Claudio A. Hernandez, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/234,008

(22) Filed: Sep. 23, 2005

(65) Prior Publication Data

US 2006/0288767 A1 Dec. 28, 2006

Related U.S. Application Data

(60) Provisional application No. 60/693,967, filed on Jun. 24, 2005.

(51) Int. Cl.
*G01M 15/00* (2006.01)
(52) U.S. Cl. .................................. 73/117.3
(58) Field of Classification Search .................. 73/116, 73/117.2, 117.3, 118.1; 340/439, 441
See application file for complete search history.

(56) References Cited

U.S. PATENT DOCUMENTS

| | | | | |
|---|---|---|---|---|
| 5,381,688 A | * | 1/1995 | Ikeda et al. | 73/105 |
| 5,505,075 A | * | 4/1996 | Pfleger et al. | 73/105 |
| 5,507,180 A | * | 4/1996 | Tomisawa | 73/117.3 |
| 5,515,720 A | * | 5/1996 | Remboski et al. | 73/116 |
| 5,544,521 A | * | 8/1996 | McCombie | 73/117.3 |
| 6,799,453 B2 | * | 10/2004 | Miyauchi et al. | 73/117.3 |
| 6,907,341 B2 | * | 6/2005 | Aono et al. | 701/111 |
| 2004/0122585 A1 | * | 6/2004 | Aono et al. | 701/111 |

* cited by examiner

*Primary Examiner*—Eric S. McCall

(57) ABSTRACT

A rough road detection system for a vehicle according to the present invention includes a frequency domain module, an engine misfire module, and a rough road module. The frequency domain module converts a vector signal into a frequency domain signal. The engine misfire module determines whether an engine misfires based on the frequency domain signal. The rough road detection module determines whether the vehicle is driving on a rough road based on the frequency domain signal.

18 Claims, 5 Drawing Sheets

ROUGH ROAD DETECTION SYSTEM

CROSS-REFERENCE TO RELATED APPLICATIONS

This application claims the benefit of U.S. Provisional Application No. 60/693,967, filed on Jun. 24, 2005. The disclosure of the above application is incorporated herein by reference.

FIELD OF THE INVENTION

The present invention relates to diagnostic systems, and more particularly to a system for differentiating between rough roads and engine misfire conditions.

BACKGROUND OF THE INVENTION

Vehicles include an internal combustion engine that generates drive torque. More specifically, the engine draws in air and mixes the air with fuel to form a combustion mixture. The combustion mixture is compressed within cylinders and is combusted to drive pistons that are slidably disposed within the cylinders. The pistons rotatably drive a crankshaft that transfers drive torque to a transmission and wheels. When the engine misfires, the combustion mixture of a cylinder combusts at the wrong time and may cause engine vibration and driveline oscillation.

Engine control systems sometimes include misfire detection systems that determine when the engine misfires. The engine control system can adjust engine operation to reduce engine misfire, thereby improving engine performance and vehicle drivability. Some road conditions can cause the engine control system to incorrectly register a misfire event when one has not actually occurred. For example, rough roads can induce feedback torque on the wheels that can affect rotation of the crankshaft. Abnormal crankshaft rotation is one characteristic of an engine misfire event.

Some misfire detection systems identify misfire events based on changes in engine speed with respect to a reference. The reference represents expected changes in speed of a normal engine operating in similar conditions and may be obtained experimentally by running a vehicle at different operating conditions without misfire. When misfire occurs, the drop in engine torque produces a corresponding drop in engine speed. This speed change is sometimes greater than changes in a reference.

Rough roads also produce changes in engine speed that are similar in magnitude to those generated by engine misfire events. This poses a problem for engine misfire detection systems that rely on changes in engine speed to detect engine misfire events. To prevent the systems from generating false misfire events due to rough roads, the misfire detection system may be disabled when rough roads are detected. Of course, this assumes that a reliable rough road detection system is available.

In another approach, anti-lock braking systems (ABS) are used to detect rough road. More specifically, the ABS generates a rough road signal when a rough road is present. This signal from the ABS module disables the misfire detection system when the rough road signal is asserted.

SUMMARY OF THE INVENTION

A rough road detection system for a vehicle according to the present invention includes a frequency domain module, an engine misfire module, and a rough road module. The frequency domain module converts a vector signal into a frequency domain signal. The engine misfire module determines whether an engine misfires based on the frequency domain signal. The rough road detection module determines whether the vehicle is driving on a rough road based on the frequency domain signal.

In other features, the rough road detection system includes an engine speed module, a sampling module, a filter module, a data reduction module, a data buffer module, a power spectrum module, and an energy calculation module. The engine speed module generates an engine speed signal based on a crank signal. The sampling module samples the engine speed signal at a fixed rate and generates a sampled signal. The filter module removes components from the sampled signal that are greater than a predetermined frequency and generates a filtered signal. The data reduction module reduces the filtered signal to correspond with at least one engine cycle and generates a reduced data signal. The data buffer module assembles samples of the reduced data signal to form the vector signal. The power spectrum module calculates the power spectrum of the frequency domain signal and generates a power spectrum signal. The energy calculation module generates an energy signal based on the power spectrum signal.

In still other features, the engine misfire module determines whether an engine misfires based on the power spectrum signal. The rough road module determines that the vehicle is driving on a rough road when the energy signal is greater than an energy threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
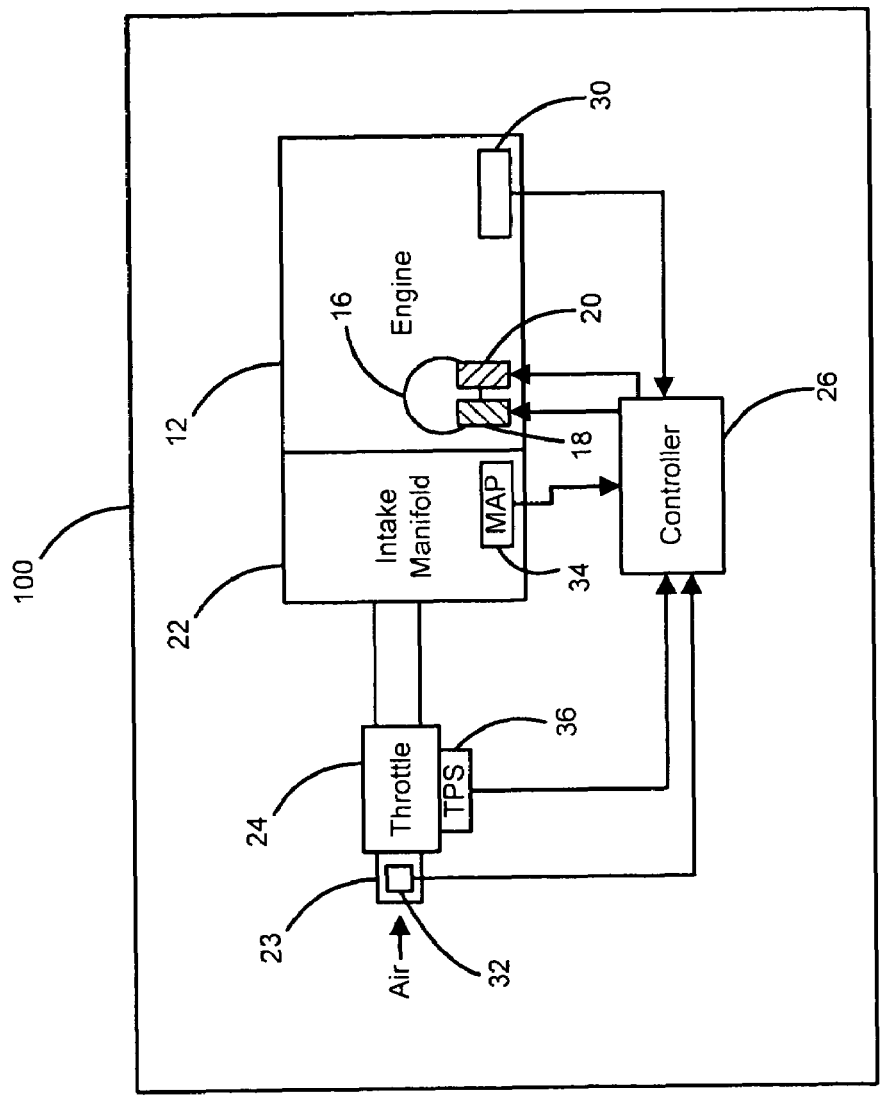
FIG. 1 is a functional block diagram of a vehicle implementing a rough road detection system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring to FIG. 1, a vehicle 10 is shown and includes an engine 12. The engine 12 includes a cylinder 16 having an associated fuel injector 18 and spark plug 20. Although a single cylinder 16 is shown, it will be appreciated that the engine 12 can include multiple cylinders 16 with associated fuel injectors 18, spark plugs 20, and intake and exhaust valves (not shown). For example, the engine 12 may include 4, 5, 6, 8, 10, or 12 cylinders 16. Air is drawn into an intake manifold 22 of the engine 12 through an inlet 23. A throttle 24 regulates the air flow into the intake manifold 22. Fuel and air are combined in the cylinder 16 and are ignited by the spark plug 20. Inlet and exhaust valves (not shown) control entry and exit of the air/fuel mixture and exhaust gas, respectively. Pushrods and/or one or more overhead cams with cam lobes can be used to open and close the intake and exhaust valves.

A controller 26 communicates with a crank position sensor 30 that generates a crank position signal based on rotation of the crankshaft. The controller 26 also communicates with a mass air flow (MAF) sensor 32 and manifold absolute pressure (MAP) sensor 34, which generate MAF and MAP signals, respectively. The controller 26 also communicates with a throttle position sensor (TPS) 36 that generates a TPS signal.

The crank position sensor 30 may be responsive to a toothed wheel (not shown) that rotates with the crankshaft. The toothed wheel includes a plurality of equally spaced teeth that radially extend therefrom. At least one tooth may be missing to define a gap. For example, the toothed wheel can include teeth that are sufficiently sized and spaced to accommodate 60 teeth. However, two teeth are missing for an actual total of 58 teeth disposed about the toothed wheel. The missing teeth define the gap. In this example, each tooth corresponds to 6° of rotation of the crankshaft (i.e., 360°/60 teeth). The gap corresponds to a rotational position of the crankshaft relative to a piston position within a cylinder. For example, the end of the gap can indicate that a particular piston is at top-dead-center (TDC) within its cylinder.

A pulse train is generated as the individual teeth rotate past the crank position sensor 30. Each pulse within the pulse train corresponds to a tooth of the toothed wheel. For the exemplary toothed wheel described above, each pulse corresponds to 6° of crankshaft rotation. The engine speed in revolutions per minute (RPM) is determined based on the pulse train. While a particular method is described, skilled artisans will appreciate that other systems and methods for sensing engine speed may be used.

The controller 26 implements a rough road detection system of the current invention to determine whether the vehicle 10 is experiencing a rough road condition (i.e., traveling on a rough road) based on frequency domain components. More specifically, the system determines event-domain instantaneous engine speed, which is defined as the amount of time required for the crankshaft to rotate through a particular period (e.g., 30°, 60°, 90°, 120°). For example, if a period of 30° is used, the controller 26 determines the amount of time associated with 5 pulses in the pulse train (i.e., 5 pulses×6°/pulse=30°).

The system samples the event-domain engine speed and a low-pass filter removes frequency components outside of a rough road frequency range. A data reduction module may be used to re-sample the filtered engine speed to reduce the number of engine speed samples. A data buffer module assembles the samples of the engine speed signal to form a vector of a given dimension. A frequency domain module uses a fast Fourier transform to convert the time-domain data into frequency-domain data. The energy of the frequency-domain components is calculated and compared with values from prior tests to determine whether a rough road exists or whether an engine misfire occurred. If the vehicle 10 is experiencing a rough road condition, the controller 26 disables an engine misfire detection system. In this manner, false misfire indications are reduced as a result of the rough road condition.

Figure 2:
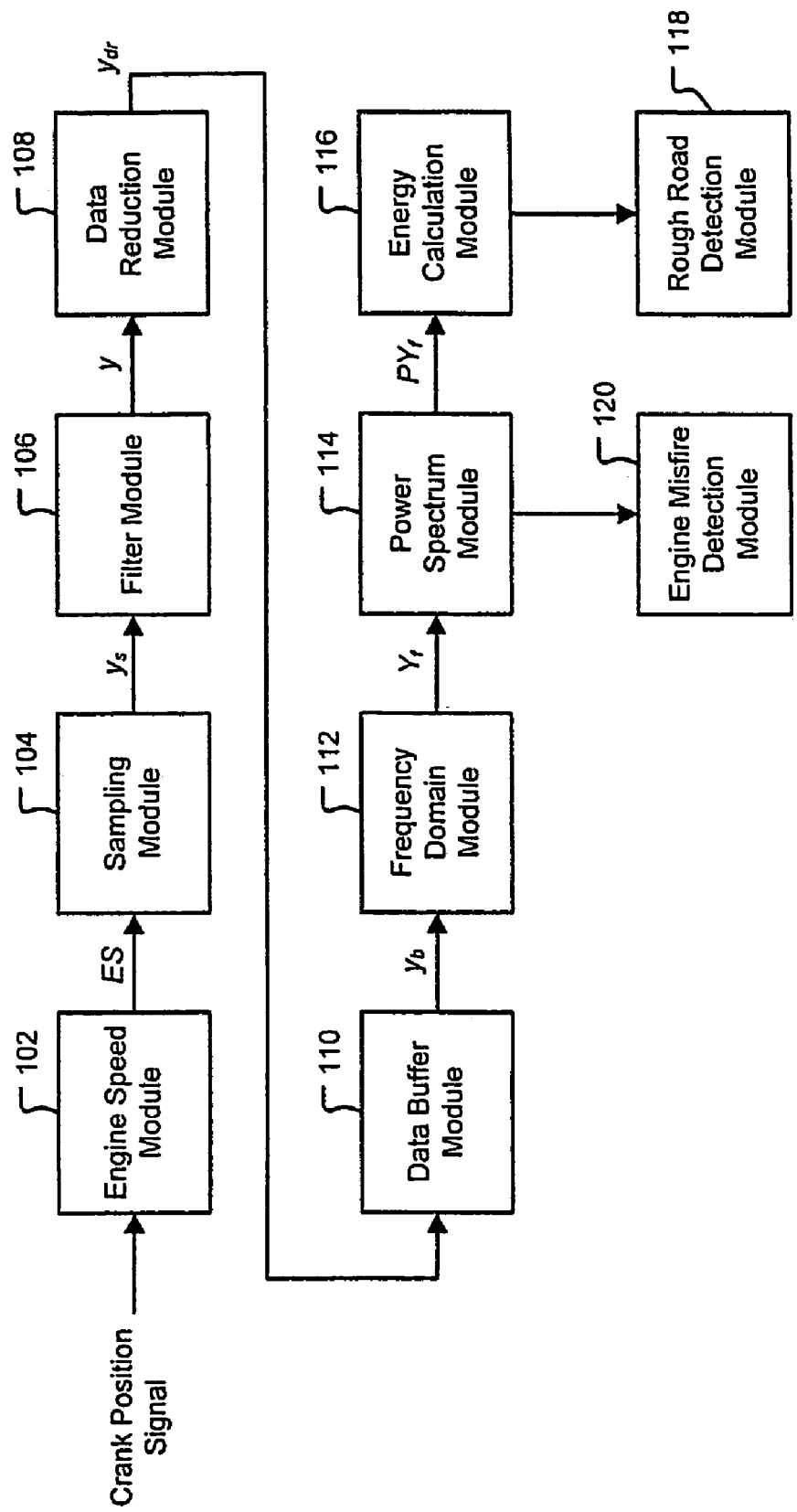
FIG. 2 is a functional block diagram of the rough road detection system of the present invention.

Referring now to FIG. 2, a digital signal processing (DSP) based rough road detection system 100 includes an engine speed module 102, a sampling module 104, a filter module 106, a data reduction module 108, a data buffer module 110, a frequency domain module 112, a power spectrum module 114, an energy calculation module 116, a rough road module 118, and an engine misfire module 120.

The engine speed module 102 calculates engine speed based on a time lapse between teeth of a target wheel and generates an engine speed signal. The engine speed signal may be characterized by the following equation:

$$ES = \frac{60}{N * dt}$$

where N is the number of teeth of the target wheel and dt is the time lapse between the teeth.

The sampling module 104 samples the calculated engine speed using a fixed sampling rate and generates a sampled signal. The sampled signal is a time-domain discrete engine speed signal having equally spaced samples. For example, if the sampling frequency is 1,000 samples/sec, the separation between samples is the sampling period, Ts=1/fs=1 millisecond. The sampled signal may be characterized by the following equation:

$$y_s = \sum_{k=0}^{Ns} ES(kT_s)$$

where $y_s$ is the sampled signal, ES is the engine speed signal, $T_s$ is a sampling period, and $N_s$ is a total number of samples. The sampling of the estimated engine speed at the input of the sampling module 104 may require interpolation between engine speed samples.

The filter module 106 is used to remove components outside of a rough road frequency range and generates a filtered signal. The rough road frequency range is typically 0-5 Hz. Therefore, a digital low-pass filter can be used to remove unwanted high frequency components. The filter module 106 may be characterized by the following equation:

$$y = \sum_{n=0}^{m} b_n y_s(k - n)$$

where y is the filtered signal, $y_s$ is the sampled signal, m is the number of filter stages or taps, k is the sample number (1,2,3 . . . ), and $a_n$ and $b_n$ are filter coefficients.

The data reduction module 108 re-samples the filtered signal using a sampling rate (fr) that is lower than the sampling rate used in the sampling module 104 and generates a reduced data signal. The objective is to reduce the number of samples such that the data in the reduced data signal corresponds to at least one engine cycle. Therefore, fr=fs/n, where n is an integer greater than 1. The reduced data signal generated by the data reduction module 108 may be characterized by the following equation:

$$y_{dr} = \sum_{k=0}^{Ns} y(kT_r)$$

where $y_{dr}$ is the reduced data signal, Tr is the sampling period, and $N_s$ is a total number of samples. To optimize the algorithm, it may be possible to combine the two sampling blocks described above (sampling module 104 and data reduction module 108) into the sampling module 104.

The data buffer module 110 assembles samples of the reduced data signal to form a vector having N dimensions and generates a vector signal. The vector signal may be characterized by the following equation:

$$y_b = [y_0 y_1 \ldots y_N]$$

where $y_b$ is the vector signal, $y_0\ y_1\ \ldots\ y_N$ are data components of the reduced data signal, and N is the number of samples to be assembled. Thus, the vector signal is a N-dimensional vector that is formed with samples of the reduced data signal.

The frequency domain module 112 converts the N-dimensional vector signal into frequency domain complex pairs using a fast Fourier transform (FFT) and generates a frequency domain signal. The FFT function may be characterized by the following equation:

$$Y_f = FFT(y_b)$$

where $Y_f$ is the frequency domain signal and $y_b$ is the vector signal. Both $Y_f$ and $y_b$ are vectors, however, $Y_f$ is a complex vector which is obtained from the following equations:

$$Y_f \sum_{i=1}^{N} y_b(i) w_N^{(i-1)(k-1)}$$

where $w_N = e^{-2\pi j/N}$, N is the number of samples in the data buffer module, k is the number of frequency components, and $j=\sqrt{-1}$. Each component of the $Y_f$ vector is a pair of real and imaginary numbers. These complex pairs may be characterized by the following equations:

$$\text{Re}Y_f[k] = \sum_{i=1}^{N} y_b(i)\cos(2\pi ki/N)$$

$$\text{Im}Y_f[k] = -\sum_{i=1}^{N} y_b(i)\sin(2\pi ki/N)$$

where Re $Y_f[k]$ and Im $Y_f[k]$ are the real and imaginary parts of the $Y_f$ vector.

The power spectrum module 114 determines a power spectrum of the frequency signal and generates a power spectrum signal. The power spectrum signal representing each component of the $Y_f$ vector (the frequency signal) may be characterized by the following equation:

$$PY_f = Y_f * \text{conj}(Y_f)/N$$

where $PY_f$ is the power spectrum of $Y_f$, $Y_f$ is the frequency signal, and conj($Y_f$) is the complex conjugate of $Y_f$. The complex of conjugate of a complex number, (a+jb), is defined as (a−jb).

The energy calculation module 116 determines the energy of the power spectrum signal by integrating (or summing in the case of a discrete signal) the power of all its individual components and generates an energy signal based thereon. The energy is determined over a narrow window of frequencies, which usually ranges from 1 to 5 Hz for rough road detection. This range of frequencies depends on engine operating conditions such as speed and load. A different range of frequencies may also be used as long as there is sufficient separation between the spectrum of the misfire and rough road traces.

The rough road module 118 is used to detect a rough road. The energy of the power spectrum signal over a range of frequencies (e.g., 1-5 Hz) is used to denote a rough road. However, the power spectrum signal or both the power spectrum and energy signal might be used with similar results. The rough road module 118 compares the energy signal with an energy threshold. A rough road is detected by the rough road module 118 when the energy signal is greater than the energy threshold. The energy threshold is a function of engine speed and load and may be obtained experimentally. In some applications, it may be desirable for the rough road module 118 to disable a prior art misfire detection system to prevent detecting a false misfire.

The engine misfire module 120 detects an engine misfire using the power spectrum signal. However, the energy signal over a narrow window of frequencies or both the power spectrum and energy signal can be used to detect engine misfire. To verify that a detected anomaly is a true misfire, the frequency of the power spectrum component may be compared to engine operating conditions such as the calculated engine speed. If the frequency of the misfire induced power spectrum signal component does not agree with the calculated engine speed, additional samples (e.g., engine cycles) can be collected and statistical analysis may be used to determine whether the anomaly was the result of an engine misfire.

The DSP based rough road detection system 100 described above is preferably calibrated and optimized such that a maximum separation between misfire and rough road is obtained. Parameters that can be adjusted include the sampling frequencies, the number of samples of the engine speed signal (e.g., sampling module 104 and data reduction module 108), the parameters of the filter module 106 (e.g., coefficients), and the energy threshold.

Figure 3:
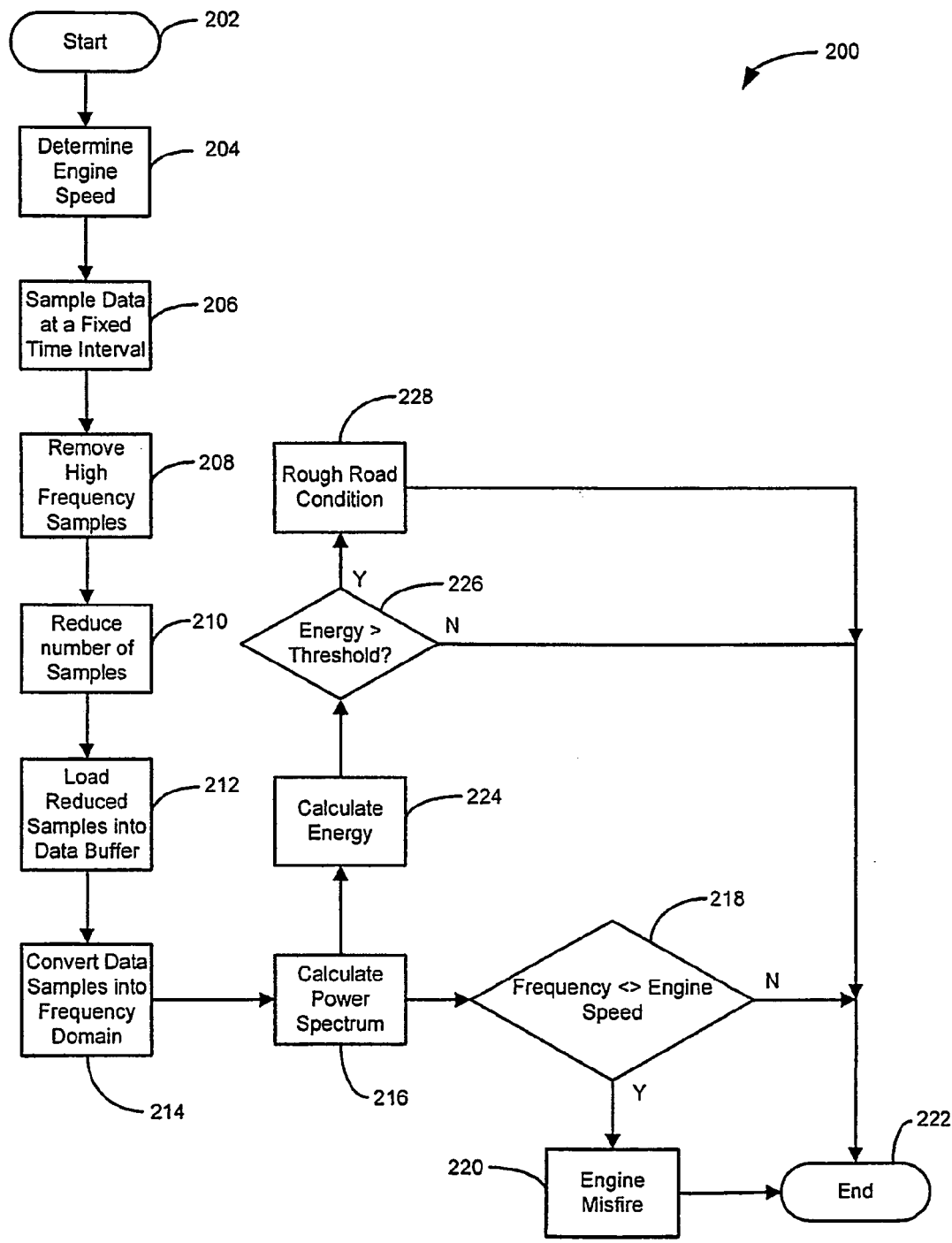
FIG. 3 is a flowchart illustrating steps executed by the rough road detection system of the present invention.

Referring now to FIG. 3, the DSP based rough road detection system 100 implements the steps generally shown at 200. The process starts at step 202 when the vehicle 10 is started.

In step 204, the engine speed module 102 determines engine speed based on the crank position sensor 30. More specifically, the engine speed module 102 calculates engine speed based on a time lapse between teeth of a target wheel and generates an engine speed signal based thereon. Thus, the engine speed signal is an event-domain signal.

In step 206, the sampling module 104 samples the engine speed at a fixed rate and generates a sampled signal. The sampled signal generated is a time-domain discrete engine speed having equally spaced samples.

In step 208, the filter module 106 removes frequency components that are higher than those generated by the vehicle 10 traversing a rough road. Frequencies generated by rough roads are typically 5 Hz or less. Thus, a low pass filter may be implemented in the filter module 106.

In step 210, the data reduction module 108 reduces the number of samples to correspond with at least one engine cycle and generates a data reduction signal. To achieve this objective, the sampling rate of the data reduction module should be less than the rate used in the sampling module 104.

In step 212, the data buffer module 110 assembles the samples from the data reduction module 108 and generates a vector signal. The vector signal is a N-dimensional vector that is made up of samples from the data reduction signal.

In step 214, the frequency domain module 112 converts the N-dimensional vector signal from the data buffer module 110 into the frequency domain and generates a frequency domain signal. The frequency domain module 112 converts the vector signal into the frequency domain signal using a fast Fourier transform.

In step 216, the power spectrum module 114 determines the power spectrum of the frequency domain signal and generates a power spectrum signal. The power spectrum signal represents the power for each component of the frequency domain signal.

In step 218, the engine misfire module 120 determines whether an engine misfires by comparing the frequency of a component in the power spectrum signal to engine operating conditions such as the calculated engine speed. If the frequency of the misfire induced power spectrum signal component does not agree with the calculated engine speed, additional samples can be collected and statistical analysis may be used to determine whether the anomaly was the result of an engine misfire. If the engine misfire module 120 determines that the engine has misfired, the misfire is reported in step 220 and the process ends in step 222. If the engine misfire module 120 determines that the engine has not misfired, the process ends in step 222.

In step 224, the energy calculation module 116 calculates the energy of the power spectrum signal over a range of frequencies (typically 1-5 Hz) and generates an energy signal. If the energy signal is greater than an energy threshold, the rough road module 118 determines that a rough road condition exists in step 226. In step 228, the rough road module 118 reports the rough road condition to the controller 26 and control ends in step 222. If the rough road module determines that the energy is not greater than the energy threshold, control ends in step 222.

Figure 4:
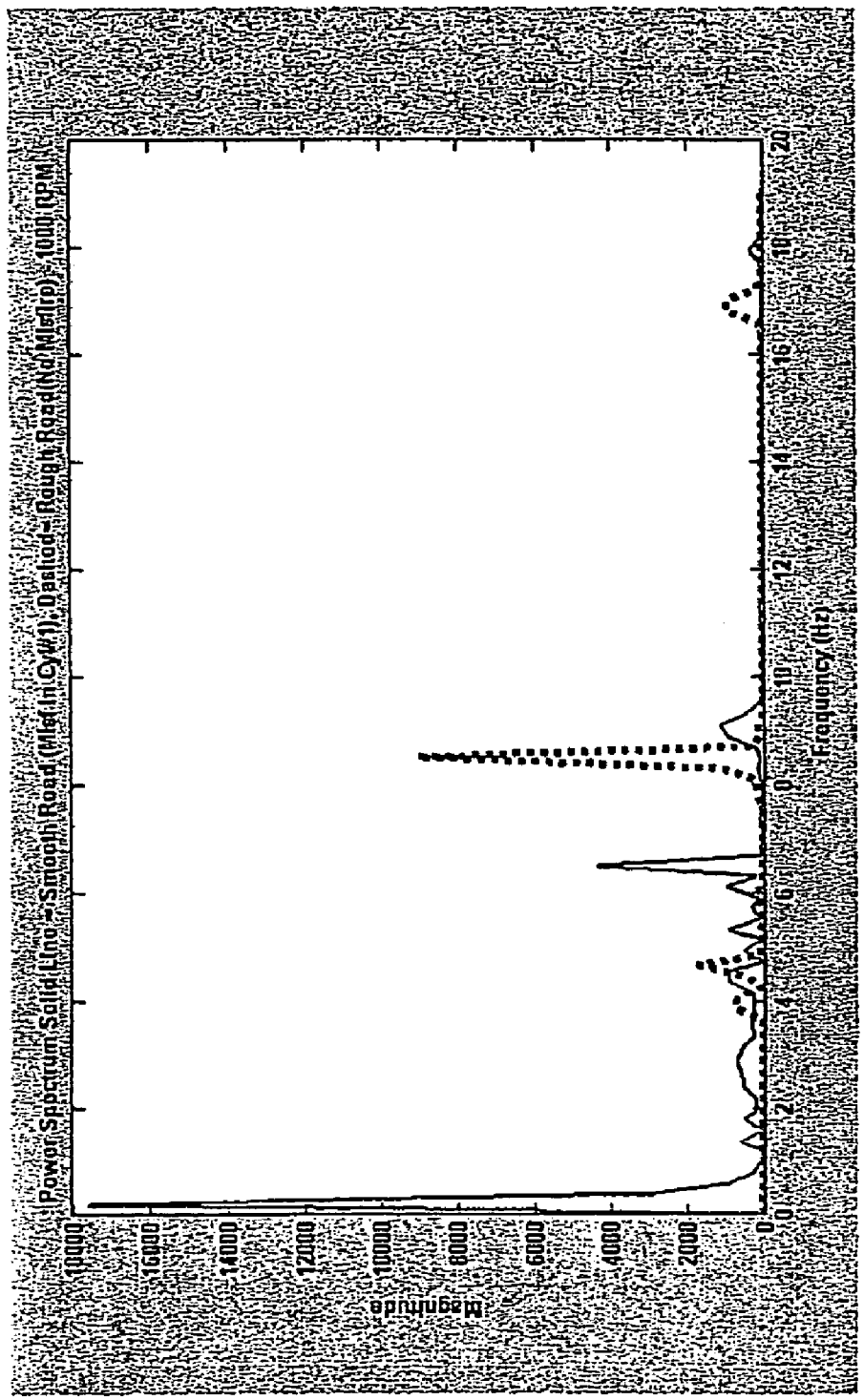
FIG. 4 is a graph of a power spectrum of a vehicle with a misfiring engine and the same vehicle driven over a rough road with no misfire at 1,000 RPM.

Referring now to FIG. 4, the performance of the DSP based rough road detection system 100 is shown. The solid line in FIG. 4 represents the vehicle 10 driven on a rough road and the dotted line represents the same vehicle 10 driven on a smooth road with a misfiring engine. Engine speed of the vehicle 10 is approximately 1,000 RPM in both tests. As seen in FIG. 4, the rough road generates low frequency (0 to 5 Hz) components having higher power than those associated with a smooth road and engine misfire. Integrating the power to obtain the energy of the signal generated by rough road over the predetermined frequency range results in a higher energy than that of a signal from smooth road and/or engine misfire.

Figure 5:
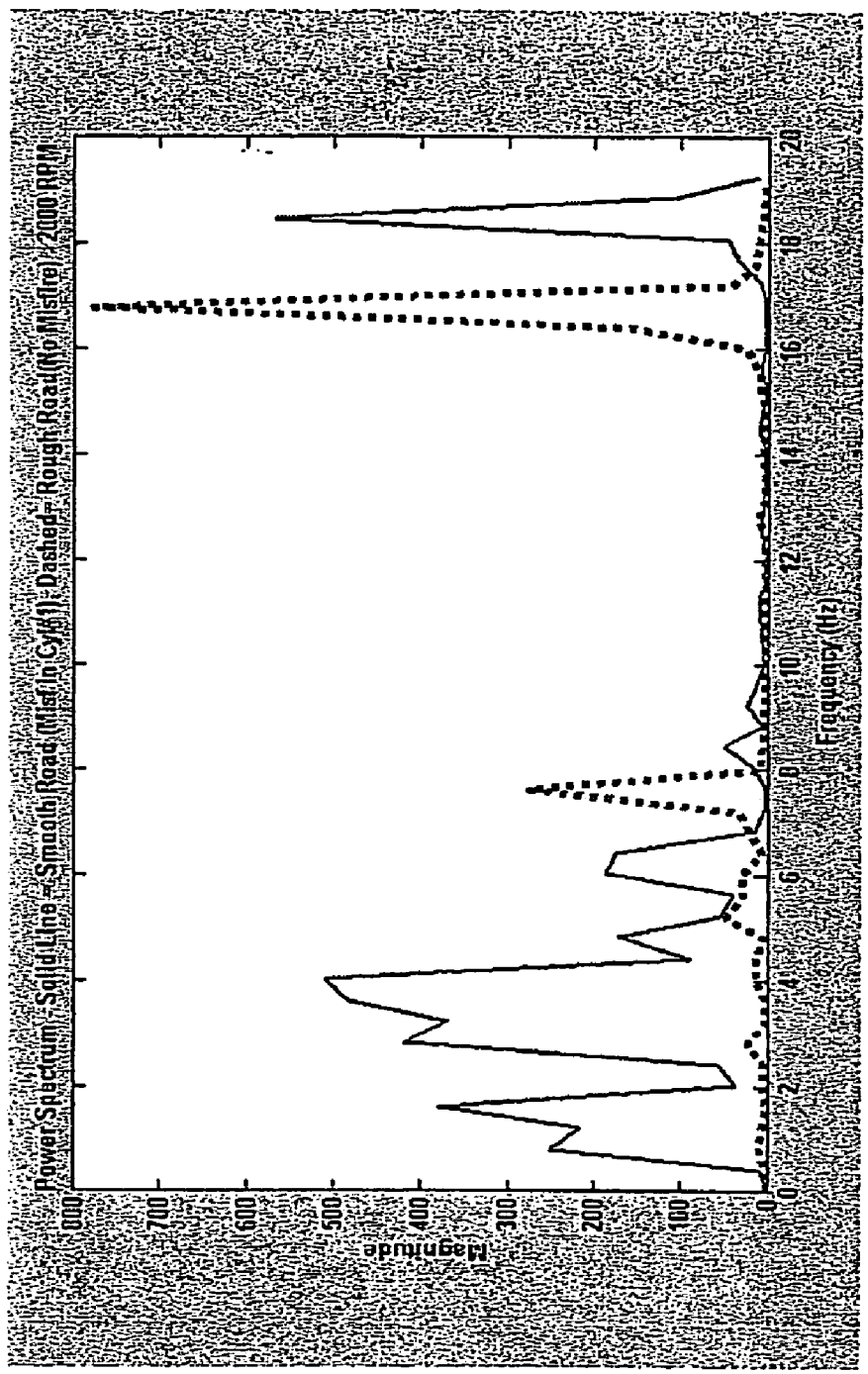
FIG. 5 is a graph that depicts the same information as FIG. 4, but with an engine speed of 2,000 RPM.

Referring now to FIG. 5, the results are similar to those shown in FIG. 4, but the same vehicle 10 was driven at a different engine speed and over a rougher road. A misfire in cylinder one in FIG. 4 generated a frequency component around 8 Hz because the engine was running around 1,000 RPM. Since the data shown in FIG. 5 was from the same engine running at twice that speed (i.e., 2,000 RPM), the same engine misfire generated a frequency component around twice the frequency (i.e., 16 Hz) of that shown in FIG. 4. Therefore, rough roads generate low-frequency signal components having higher power than the corresponding frequency components of signals generated by smooth roads and engine misfire events. Thus, the system is capable of detecting engine misfire and predicting the frequency of the component generated by the engine misfire in the power spectrum signal. The frequency of components generated by cylinder misfire events are a function of engine speed and are automatically attained with the power spectrum signal.

In some applications, the DSP based rough road detection system 100 may disable a prior art misfire detection system (not shown) when a rough road condition is detected to prevent reporting false engine misfires. When the vehicle 10 begins to traverse a smooth road, the DSP based rough road detection system 100 may re-enable the prior art misfire detection system (not shown).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rough road detection system for a vehicle, comprising:
    a frequency domain module that converts a vector signal into a frequency domain signal;
    an engine misfire module that determines whether an engine misfires based on at least one of a power and an energy of said frequency domain signal;
    a rough road module that determines whether the vehicle is driving on a rough road based on at least one of said power and said energy of said frequency domain signal.

2. The rough road detection system of claim 1 further comprising:
    an engine speed module that generates an engine speed signal based on a crank signal; and
    a sampling module that that communicates with said engine speed module, that samples said engine speed signal at a fixed rate, and that generates a sampling signal.

3. The rough road detection system of claim 2 further comprising a filter module that communicates with said sampling module, that removes components from said sampling signal that are greater than a predetermined frequency, and that generates a filtered signal.

4. The rough road detection system of claim 3 further comprising a data reduction module that communicates with said filter module, that reduces said filtered signal to correspond with at least one engine cycle, and that generates a reduced data signal.

5. The rough road detection system of claim 4 further comprising a data buffer module that communicates with said data reduction module and that assembles samples of said reduced data signal to form said vector signal.

6. The rough road detection system of claim 5 further comprising a power spectrum module that communicates with said frequency domain module, that calculates the power spectrum of said frequency domain signal, and that generates a power spectrum signal.

7. The rough road detection system of claim 6 wherein said engine misfire module determines whether an engine misfires based on said power spectrum signal.

8. The rough road detection system of claim 6 further comprising an energy calculation module that communicates with said power spectrum module and that generates an energy signal based on said power spectrum signal.

9. The rough road detection system of claim 8 wherein said rough road module determines that the vehicle is driving on a rough road when said energy signal is greater than an energy threshold.

10. A method to detect a rough road condition for a vehicle, comprising:
    converting a vector signal of engine speed samples into a frequency domain signal;
    determining at least one of a power and an energy of said frequency domain signal;
    determining whether an engine misfires based on at least one of said power and said energy of said frequency domain signal;
    determining whether the vehicle is driving on a rough road based on at least one of said power and said energy of said frequency domain signal; and
    generating a rough road condition signal based upon at least one of said determining whether said engine misfires and said determining whether said vehicle is driving on said rough road.

11. The method of claim 10 further comprising:
    determining an engine speed and generating an engine speed signal; and
    sampling said engine speed signal at a fixed rate and generating a sampling signal.

12. The method of claim 11 further comprising removing components from said sampling signal that are greater than a predetermined frequency and generating a filtered signal.

13. The method of claim 12 further comprising reducing said filtered signal to correspond with at least one engine cycle and generating a reduced data signal.

14. The method of claim 13 further comprising assembling samples of said reduced signal to form said vector signal.

15. The method of claim 14 further comprising calculating a power spectrum of said frequency domain signal and generating a power spectrum signal.

16. The method of claim 15 further comprising determining whether an engine misfires based on said power spectrum signal.

17. The method of claim 15 further comprising calculating an energy signal based on said power spectrum signal.

18. The method of claim 17 further comprising determining that the vehicle is driving on a rough road when said energy signal is greater than an energy threshold.

* * * * *